United States Patent [19]

Krueger

[11] Patent Number: 4,702,866
[45] Date of Patent: Oct. 27, 1987

[54] METHOD OF MAKING AN EXPANDED BALL BATTING AID

[75] Inventor: Dennis M. Krueger, St. Joseph, Mich.

[73] Assignee: K-Bear Athletics, Inc., St. Joseph, Mich.

[21] Appl. No.: 778,475

[22] Filed: Sep. 20, 1985

Related U.S. Application Data

[62] Division of Ser. No. 625,879, Jun. 28, 1984, abandoned.

[51] Int. Cl.⁴ .................. B29C 67/22; B29C 39/10; C08J 9/34
[52] U.S. Cl. .................. 264/46.4; 264/45.5; 264/46.9; 264/137; 273/58 C
[58] Field of Search .................. 264/46.9, 51, 46.4, 264/137, 45.5; 273/58 C

[56] References Cited

U.S. PATENT DOCUMENTS

| 1,563,912 | 12/1925 | Miller | 273/58 C |
| 3,652,088 | 3/1972 | Marsh | 273/26 E |
| 3,862,757 | 1/1975 | Craig, II | 273/58 C |

OTHER PUBLICATIONS

Alderfer, Sterling "One-Shot" Polyurethane Production in *Rubber Age*, Apr. 1963, pp. 89-93.

Primary Examiner—Philip Anderson
Attorney, Agent, or Firm—Flynn, Thiel, Boutell & Tanis

[57] ABSTRACT

A ball batting aid consisting of a spherical ball made of an expandable elastomeric material having a finite length of braided rope secured thereto, the ball being formed so that there is no air pocket within the confines thereof. An enlargement is placed on one end of the rope located in the central portion of the ball and when the ball is formed, the elastomeric material is expanded into the space between the braids of the rope to effect a securement of the material to the rope.

3 Claims, 4 Drawing Figures

METHOD OF MAKING AN EXPANDED BALL BATTING AID

This is a division of application Ser. No. 625,879 filed June 28, 1984, now abandoned.

FIELD OF THE INVENTION

This invention relates to a ball batting aid and a process for making same.

BACKGROUND OF THE INVENTION

Ball batting aids having a ball secured to the end of an elongated rope have been used in training ball players for many years. One player places the rope into the hands and then twirls the ball around the head gradually playing out more rope until the ball approaches a plate at which another ball player is standing with a ball bat. It is the object of the player with the bat to strike the ball as it passes over the plate. The ball player twirling the ball can control the angle at which the ball approaches the plate to give the batter a variety of different types of ball movements. Further, the task of fielding a hit ball by a group of fielders is entirely eliminated.

It has been a problem to affix the ball to the rope in a safe and secure manner. One such attempt included the placement of an eye-bolt in a hole extending through the ball. The eye-bolt structure projected beyond the outer surface of the ball and did damage to the bat when it struck the ball. Thus, this structure proved to be an undesirable structure to use on a repeated basis. Another effort was made to secure the rope to the ball by drilling a hole through the ball, threading the rope into the hole and then driving fasteners into the ball at various angles through the rope to hold the rope inside the ball. This structure also proved disadvantageous for after many strikings of the ball by a bat, the connection of the ball to the rope loosened. Further, the hole through the central portion of the ball had a tendency to lessen its resilient characteristic over a prolonged period of time.

Accordingly, it is an object of this invention to provide a ball batting aid comprising a ball fastened to an elongated strand of rope wherein the structure for fastening the ball to the rope is secure and durable and does not lessen the resilient characteristic of the ball after prolonged uses thereof.

It is a further object of the invention to provide a ball batting aid, as aforesaid, wherein the rope is braided and the elastomeric material of the ball is an elastomeric which permeates the space between the braids inside the ball to effect a permanent and secure fastening of the ball to the rope.

It is a further object of the invention to provide a ball batting aid, as aforesaid, wherein during the process of making the ball and effecting a fastening of the rope thereto, the elastomeric material of the ball is permitted to permeate the braids of the rope as well as along a portion of the rope external of the ball so that the region of the rope immediately adjacent the peripheral surface of the ball is strengthened to thereby endure a particular stress on the rope at the point it enters the ball.

It is a further object of the invention to provide a ball batting aid, as aforesaid, wherein during the process of making the ball and effecting a fastening of the rope thereto, the amount of the expandable elastomeric material and catalyst therefor are precisely controlled to take into account the presence of the rope material within the mold and the space between the braids so that an air pocket is not formed inside the ball and, at the same time, excessive material is not permitted to squirt out through the opening in the mold through which the rope extends.

SUMMARY OF THE INVENTION

In general, the objects and purposes of the invention are met by providing a ball batting aid having a spherical ball made of an expanded elastomeric material and a finite length of braided rope fixedly fastened thereto. The braided rope has an enlarged knot tied in one end thereof and the knot is located at the center of the spherical ball, the remainder thereof extending on a radius of the ball and external thereto. During the process of forming the ball, the volume of expandable elastomeric material and catalyst therefor is precisely controlled to effect an expansion of the elastomeric material within the mold and fill the space between the braids of the rope to effect the aforesaid securement of the rope to the ball and without forming any air pocket within the ball.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 1:
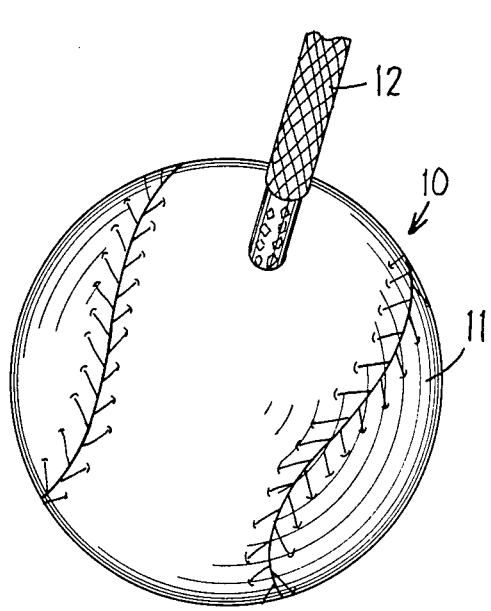
FIG. 1 is a view of the ball batting aid embodying the invention.

A ball batting aid 10 is illustrated in FIG. 1 and includes a spherical ball member 11 and an elongated strand of rope 12 fixedly secured thereto. It is to be recognized that the ball member 11 can be of a baseball size having a circumference in the range of 9 inches to 9¼ inches (22.9 centimeters to 23.5 centimeters) or a softball size having a circumference between 11⅞ inches and 12⅛ inches (30.2 centimeters to 31.1 centimeters).

Figure 2:
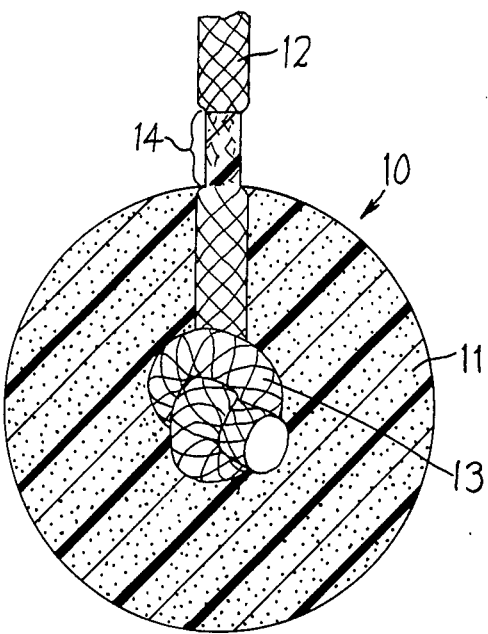
FIG. 2 is a central sectional view taken on a diameter through the ball.

In this particular embodiment, the rope is a braided nylon rope having an air space between the various braids thereof. An enlarged knot 13 is formed on one end of the rope, namely, that end which is located at the center of the ball 11 as illustrated in FIG. 2. It is to be recognized that an enlargement of various kinds can be fixedly secured to the rope to replace the need for a knot. The material of the ball, during the process of forming the ball, as will be explained in more detail below, is permitted to permeate the space between the braids of the rope 12 as well as the knot portion 13 thereof so that there will be no air pocket formed within the confines of the ball 11. In addition, the material of the ball is permitted to enter the space between the braids along a segment 14 of the rope 12 located external of the periphery of the ball 11. It has been discovered that the material permeating the air space between the braids of the rope along this particular section of the rope enhances the connection of the rope to the ball at the point it enters the ball and permits repeated strikings of the ball without effecting any noticeable wear on the rope at the point it enters the ball. If desired, the volume and density of the material of the ball can be controlled so that it will not extend beyond the periphery of the ball and there will be no segment 14 visible to the user.

Figure 3:
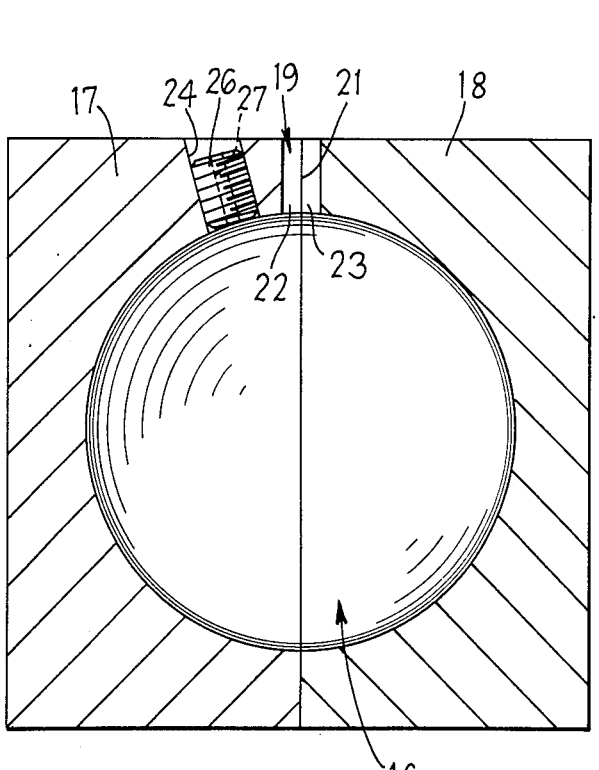
FIG. 3 is a central sectional view through a mold cavity taken on a plane perpendicular to the parting plane between the mold halves.

FIG. 3 illustrates a mold cavity 16 formed in a pair of mating mold halves 17 and 18. An opening 19 is provided in the mold preferably at the parting line 21. The opening 19 is preferably cylindrical so that one half 22 is semicylindrical and is provided in the mold half 17 and the corresponding and mating other half of the opening is also semicylindrical as at 23 and is provided in the other mold half 18. The diameter of the opening 18 is preferably less than the diameter of the rope. A further opening 24 is provided in the mold for facilitating the filling of the mold with the expandable elastomeric material and the catalyst therefor. An appropriate plug or set screw 26 is provided for closing the opening 24.

Figure 4:
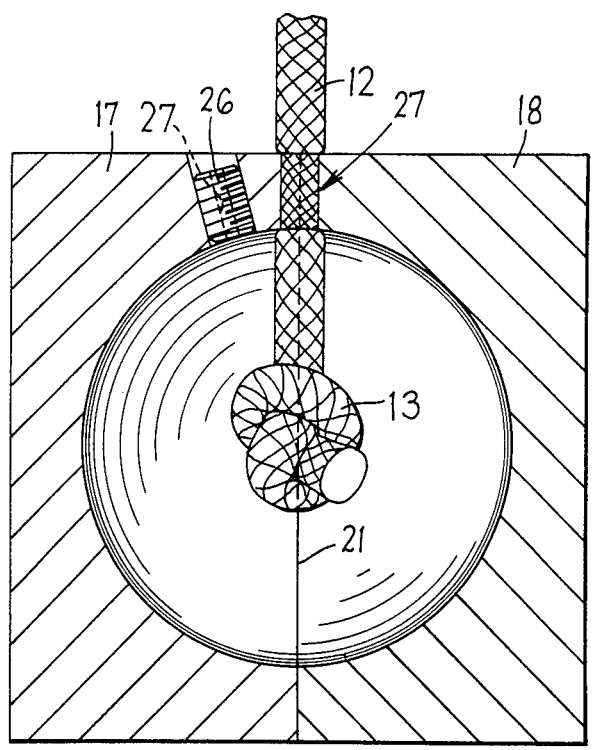
FIG. 4 is a central sectional view of the mold cavity prior to a fill thereof with expandable elastomeric material and a catalyst therefor and indicating the manner in which the rope is placed into the mold cavity at this point in the mold cycle.

While the mold is open, an elongated strand of rope 12 having the knot 13 therein or other enlargement thereon is placed into one of the semicylindrical openings 22 or 23 in the selected one of the mold halves 17 and 18. The knot 13 or other enlargement is oriented so that it is generally at the center of the mold cavity 16 as illustrated in FIG. 4. Thereafter, the mold halves are closed to the position illustrated in FIG. 4 so that the other semicylindrical half of the opening 19 will close upon the rope and pinch it to a smaller diameter as illustrated at 27 in FIG. 4. The purpose of pinching the rope 12 is substantially to physically plug the opening 19 so that the foaming plastic material in the mold cavity 16 will not be able freely to escape from said mold cavity. However, the pinched portion 27 of the rope still retains some of its internal porosity so that air in the interior of the cavity and in the rope can escape through the pinched portion 27 during molding. The foaming plastic material eventually will permeate into the pinched portion 27 and solidify therein to form the segment 14 in which the interstices between the fibers are filled with solidified elastomeric material.

After the mold is closed, the plug 26 is removed and a charge of the molding formulation for forming the foamed plastic material is introduced into the mold cavity 16, followed thereafter by a replacement of the plug 26 as shown in FIG. 4 into the opening. The liquid expandible elastomeric has a density of 62.4 pounds per cubic foot. A small opening 27 is provided through the center of the plug to allow for the escape of air within the mold cavity. The mold is then rotated to coat the inside surface of the mold with the material of the charge. The opening is oriented at the top, namely the mold parting plane is oriented to bring the opening 27 into alignment with the vertical.

For a baseball size ball element, the mold cavity has a volume of 12.3 cubic inches. For a softball size ball, the mold cavity has a volume of 29.2 cubic inches. The molding formulation can be a conventional formulation effective for making a molded, elastomeric, foam ball capable of withstanding being hit by a baseball bat. Preferably the elastomeric foam is a microcellular urethane foam having an integral skin. As is well known, molding formulations for forming urethane foams comprise at least one polyol (either polyether or polyester), at least one polyisocyanate, a catalyst, a surface active agent and a blowing agent. The proportion of polyol to polyisocyanate can be varied to adjust the properties of the foamed product. The density of the foam ball can be controlled by controlling the amount (weight) of the molding formulation that is poured into the mold. Further, the thickness of the integral skin can be controlled by varying the mold temperature; a cold mold will give a thicker skin and vice versa. Following expansion of the elastomeric material within the mold to form the ball, the ball of baseball size will have a weight in the range of 142 to 153 grams and a density of about 45.5 pounds per cubic foot. The ball of a softball size will have a weight of 178 to 195 grams and a density of about 24.4 pounds per cubic foot. Further, during a rebound test wherein the ball is dropped from a height of 20 feet and the amount at which it rebounds is measured, the baseball will rebound to a height of between 72 and 82 inches (182.9 centimeters to 208.3 centimeters) and the softball will rebound in the range between 71 inches and 79 inches (180.3 centimeters to 200.1 centimeters).

The fluidity of the molding formulation during the expansion process will be sufficient to permit the material to permeate the internal spaces between the fibers of the rope to displace air therefrom and thereby purposefully prevent the formation of an air pocket within the confines of the ball. In this particular embodiment, the expansion will be sufficient to force the material into the opening 19 through the remaining air space between the now-pinched braids of the rope to cause the material to form along the segment 14 of the rope external of the confines of the ball. The expansion will, however, be insufficient to leave the confines of the opening 19. Thus, the segment 14 of the rope is monolithic and comes into existence during the molding operation.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A process for securing an object made of an expandible elastomeric material to a finite length of braided rope using a pair of mating mold halves each having a mold cavity therein, a cylindrical hole through the wall of said mold, the parting plane between said mold halves bisecting said hole on a diameter so that each mold half has a semicylindrical recess therein, said hole having a diameter less than the uncompressed diameter of said rope, the steps comprising:
separating said pair of mold halves to expose at least one of said mold cavities therein;
placing an enlargement on one end of said rope;
placing said enlargement into the approximate center of a mold cavity in said one of said mold halves and a length of said braided rope adjacent said enlargement in said semicylindrical recess;
moving said mold halves together into a tight sealing relation to form said mold cavity while simultaneously compressing said length of said braided rope in said hole;
filling said mold cavity with said expandible elastomeric material and a catalyst to cause said material to expand in said mold cavity to occupy the entirety thereof;

controlling the volume of said expandible elastomeric material and said catalyst introduced into said mold so that said material will expand to fill said mold cavity and permeate said rope between the braids thereof, said length of said rope in said hole and which is compressed permitting a limited outflow of material into said hole and through the spacing between the compressed braids of said rope but insufficient to leave the confines of said hole.

2. The process according to claim 1, wherein for a mold cavity volume of 12.3 cubic inches (201.6 cubic centimeters), and with said elastomeric material being isocyanate and said catalyst therefor being a blend of urethane polyol, the amount of isocyanate is 60 parts and the volume of said catalyst is 100 parts.

3. The process according to claim 1, wherein for a mold cavity volume of 29.2 cubic inches (478.6 cubic centimeters), and with said elastomeric material being isocyanate and said catalyst therefor being a blend of urethane polyol, the volume of said isocyanate is 70 parts and the volume of said urethane polyol is 100 parts.

* * * * *